United States Patent [19]
Johnson

[11] Patent Number: 5,458,290
[45] Date of Patent: Oct. 17, 1995

[54] SUBTERRANEAN SPRINKLER SUPPORTS

[76] Inventor: Christopher C. Johnson, 16852 Hay Dr., Chino Hills, Calif. 91709

[21] Appl. No.: 192,386
[22] Filed: Feb. 7, 1994
[51] Int. Cl.[6] ..................................... B05B 15/06
[52] U.S. Cl. ...................... 239/203; 239/288.5; 138/106
[58] Field of Search .................... 239/200–207, 239/288.3, 288.5, 273, 276; 248/49, 85; 205/36; 138/106

[56] References Cited

U.S. PATENT DOCUMENTS

| | | | |
|---|---|---|---|
| 3,021,078 | 2/1962 | Nickell | 239/201 X |
| 3,026,076 | 3/1962 | Bender | 138/106 |
| 3,514,040 | 5/1970 | Carson | 239/201 X |
| 3,662,956 | 5/1972 | Hedman | 239/288.5 X |
| 3,993,192 | 11/1976 | Bunn | 138/106 X |
| 4,108,439 | 8/1978 | McGuire | 239/201 X |
| 4,146,181 | 3/1979 | Soos | 239/288.5 |
| 4,350,296 | 9/1982 | Kuhlman | 239/201 |
| 4,765,541 | 8/1988 | Mangels et al. | 239/201 |
| 5,213,262 | 5/1993 | Violette | 239/288.5 X |

Primary Examiner—Andres Kashnikow
Assistant Examiner—Kevin P. Weldon
Attorney, Agent, or Firm—Plante & Strauss

[57] ABSTRACT

A sprinkler head support apparatus and pipe support apparatus for an underground sprinkler system. The sprinkler housing support includes an open cage to permit drainage of water from the sprinkler head housing. The pipe support and pop-up sprinkler housing support can be placed completely beneath the soil limiting the exposure of the sprinkler system to above ground activities and possible damage. The pipe supports are made from a durable plastic and hollow inside to permit compact stacking in storage.

17 Claims, 4 Drawing Sheets

SUBTERRANEAN SPRINKLER SUPPORTS

BACKGROUND OF THE INVENTION

1. Field of the Invention

This invention relates to underground pipe and sprinkler supports, and in particular to supports for in-ground pop-up sprinklers such as commonly used in commercial irrigation systems for parks, golf courses, etc.

2. Brief Statement of the Prior Art

The in-ground pop-up sprinklers which are commonly used in commercial irrigation systems, particularly for golf courses, have pop-up sprinklers which are contained in cylindrical housings that are mounted with their tops flush with the ground surface. It is desirable that the exposed area of the sprinkler is minimal to reduce the unsightliness and obstruction of the installation. The sprinkler heads are commonly installed on risers which are connected to subterranean water supply lines, such as water mains or laterals by swing joints which are formed with a combination of elbows and couplings which provide flexibility to the installation, permitting it to rise and fall with expansion and contractions of the surrounding earth.

A common problem which plagues such installations, particularly in sandy or loose shale soil, is the tendency of the sprinkler installations to migrate downwardly into the soil. This obstructs the sprinkler operation and also creates a hazardous condition and unsightly appearance. The problem is pointed out in U.S. Pat. No. 5,037,238 which discloses a retrieval system to restore sunken sprinklers to their original position, flush with the ground surface. This approach, however, does not alleviate or eliminate the problem; it only provides a method to restore sunken sprinklers.

There have been various discs and plates proposed for use with in-ground sprinklers, such as a thick plastic disc which is mounted entirely at the ground surface in U.S. Pat. No. 3,904,120. Another similar device is shown in U.S. Pat. No. 5,253,952 in which a large diameter hollow-form disc is placed about the sprinkler head. A similar device is shown in U.S. Pat. No. 5,222,669 in which a large diameter disc is placed about a pop-up sprinkler head. This does not provide the best support, as the top soil is the most unstable. Further, the large diameter discs are exposed at the ground surface and this is objectionable in commercial installations such as golf courses, parks and the like.

U.S. Pat. No. 4,765,541 discloses a housing for a drip irrigation emitter which is generally tubular with a top planer closure and a base flange. This housing is substantially hollow with apertures at its base to permit egress of the irrigation water.

Various techniques have been used to stabilize land drains in soil. U.S. Pat. No. 1,071,253 discloses a subterranean inverted bell housing in which the housing forms a water collector. A similar structure is shown in U.S. Pat. No. 1,140,903. U.S. Pat. Nos. 4,475,844 and 4,553,876 disclose supports for surface drains which have a generally conical disc with a central opening that slidably receives a drain pipe. This disc only provides lateral support as the drain pipes are freely slidable vertically in the supports.

Another commonly related problem is the instability of the various lateral water supply pipes of a subterranean system. Commonly, these pipes are laid in ditches several feet beneath the surface of the soil, usually on a porous base of gravel, sand or aggregate fill. These pipes often settle, causing leaks and ruptures, particularly during earthquakes or any other abrupt shifting of the ground.

OBJECTIVES OF THE INVENTION

It is an objective of this invention to provide a sprinkler support that will stabilize pop-up sprinklers and prevent their setting in the soil.

It is an additional objective of this invention to provide a sprinkler support which is completely compatible with the existing pop-up sprinkler housings.

It is a further objective of this invention to provide a sprinkler support which does not increase the exposed surface area of the sprinkler installation.

It is another objective of this invention to provide a sprinkler support for the conventional in-ground pop-up sprinkler housings which has a base that can be placed beneath the top soil.

It is yet another objective of this invention to provide a sprinkler support in the form of a cage with discontinuous sidewalls which firmly interlocks the cage in the soil.

It is still a further objective of this invention to provide a pipe saddle for use with subterranean pipes.

It is an additional objective of this invention to provide a pipe saddle for subterranean pipes that is substantially hollow-form with tapered sidewall construction which readily permits placing of a plurality of the pipe supports in stacked array.

It is an objective of the invention to provide the aforementioned pipe support of molded plastic with substantially uniform wall thickness.

Other and related objectives will be apparent from the following description of the invention.

BRIEF DESCRIPTION OF THE FIGURES

The invention will be described with reference to the FIGURES of which.

DESCRIPTION OF THE PREFERRED EMBODIMENT

Figure 1:
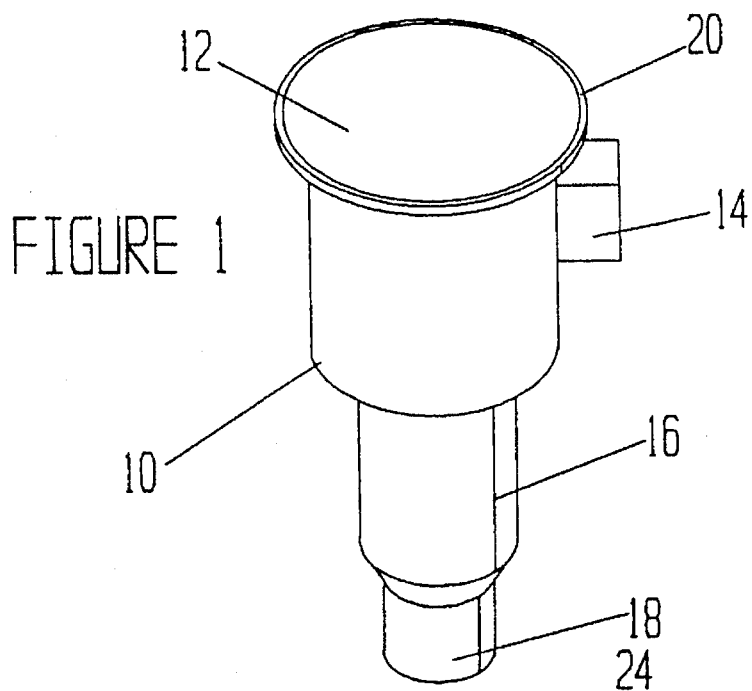
FIG. 1 is a perspective view of a conventional in-ground, pop-up sprinkler housing.

Referring now to FIG. 1, there is illustrated the conventional in-ground, pop-up sprinkler assembly. The sprinkler has a irrigation head (not shown) which is entirely contained within a general cylindrical housing 10. The housing 10 is closed with a circular cover plate 12 and is movable with upon actuation of the sprinkler, to permit the sprinkler to rise from the housing into a sprinkling position. The cylindrical housing 10 typically has a dependent generally rectangular side housing 14 attached to one side which contains the various control elements and electrical wiring contacts. The cylindrical housing 10 is frequently of a stepped diameter having a reduced diameter lower end 16 which tapers into a conventional cylindrical pipe fitting 18.

The cylindrical housing 10 usually has an annular lip 20 extending outwardly about its upper end 22 to provide some stability of the housing in the soil.

Figure 2:
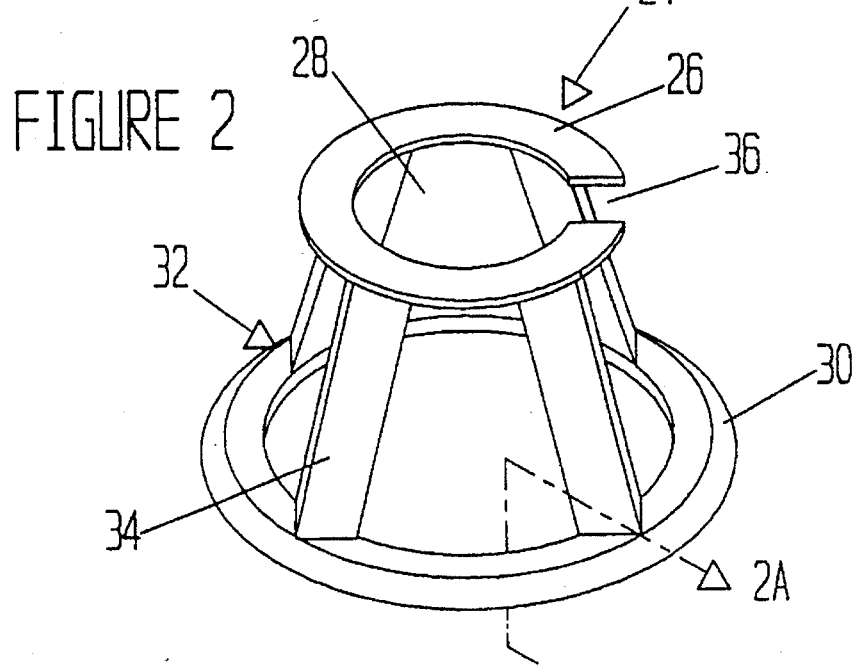
FIG. 2 is a perspective view of the sprinkler housing support cage of the invention.

Referring not to FIG. 2, the sprinkler support 24 of this invention is illustrated. As there illustrated, the sprinkler support 24 is a cage having an upper support member 26 with a circular through opening 28 of the outside diameter of the housing 10 so that the housing can be received therein. Preferably the support member 26 is an annular ring with an outer diameter which is no greater than the outer diameter of the annular lip 20 of the sprinkler housing 10, thereby insuring that the support 24 of this invention does not increase the surface exposure of the sprinkler installation.

Figure 2A:
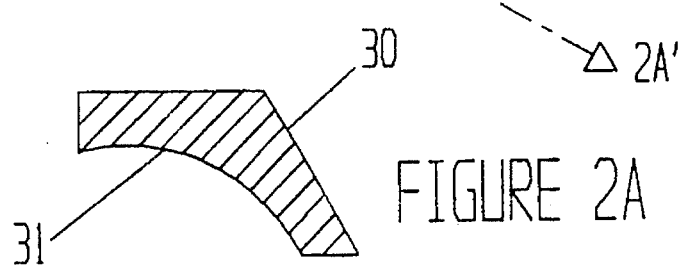
FIG. 2A is a sectional view along lines 2A—2A'.

The support 24 of the invention has a base plate 30 which has substantially greater span than the support member 26. Preferably this base plate 30 is an annular ring with an inner diameter no less than the outer diameter of the support member 26 and, preferably, substantially greater than the diameter of support member 26. The base plate 30 can be planer, or if desired, as shown in FIG. 2A, the base plate 30 can have a concave undersurface 31 for enhanced stability. The base plate 30 and support member 26 are spaced apart by a downwardly and outwardly divergent wall member 32 that is preferably formed with a plurality of support legs 34, thereby providing an open cage configuration.

The support member 26 can be provided with a radial groove or slot 36 which permits passage of the side housing 14 located on one side of the sprinkler housing wall so that the sprinkler housing 10 can be readily dropped into the support 24.

Figure 3:
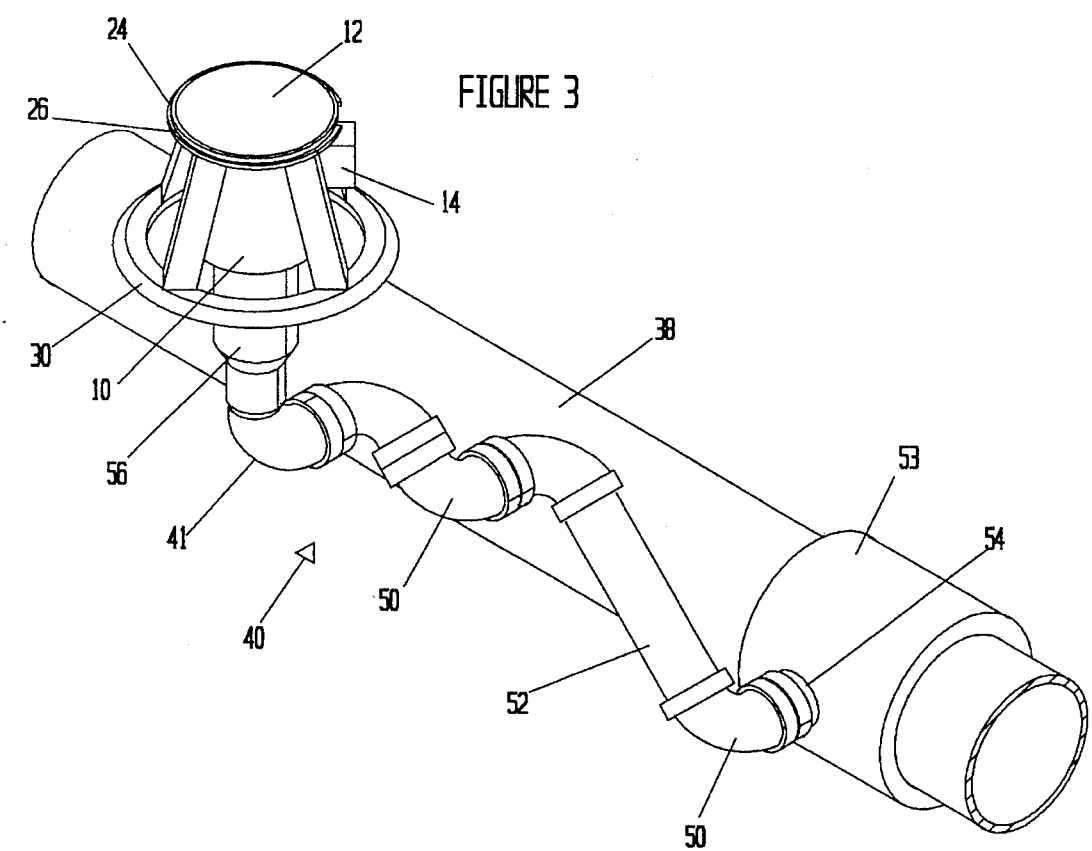
FIG. 3 is a perspective view of a typical in-ground sprinkler installation using the invention.

Referring now to FIG. 3, there is illustrated a typical sprinkler installation utilizing the support 24 of the invention. As there illustrated, the sprinkler system has a subterranean water supply line 38 to which it is connected by a flexible assembly 40 of elbows 50, and short lengths 52 of pipe. The joints of these elements provide a very flexible interconnection between the sprinkler housing 24 and the water supply line 38. The water supply line 38 has a fitting with an outlet nipple 54 that is connected to an elbow, a short length of pipe, and a series of four interconnected elbows 40 which all permit relative rotation The elbow 41 has a male end which is received in the coupling end 56 of the sprinkler head. In the illustration the sprinkler housing 24 is received within the support 24, which entirely surrounds the sprinkler housing 24. The base plate 30 extends outwardly about the sprinkler housing 24 by a substantial distance to provide an expanded support surface which greatly resists downward migration. Additionally, the downwardly and outwardly tapered configuration of the support tends to compact against the soil, thereby resisting settling forces.

The spacing between the base plate 30 and support member 26 of the support 24 can be varied as desired. Preferably, this spacing is from 0.5 to about 3 times the maximum lateral dimension of the support 24. This distance is selected to ensure that the support 24 will be located with the base plate 30 beneath the unstable top soil and well seated in the subjacent, firmer soil.

Figure 4:
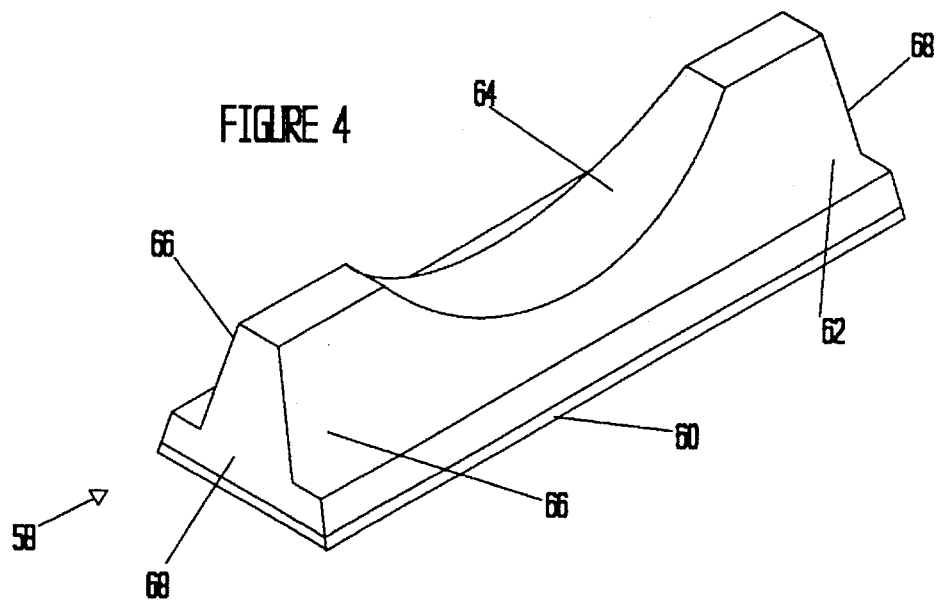
FIG. 4 is a perspective view of the upper surface of the subterranean pipe support of the invention.
Figure 5:
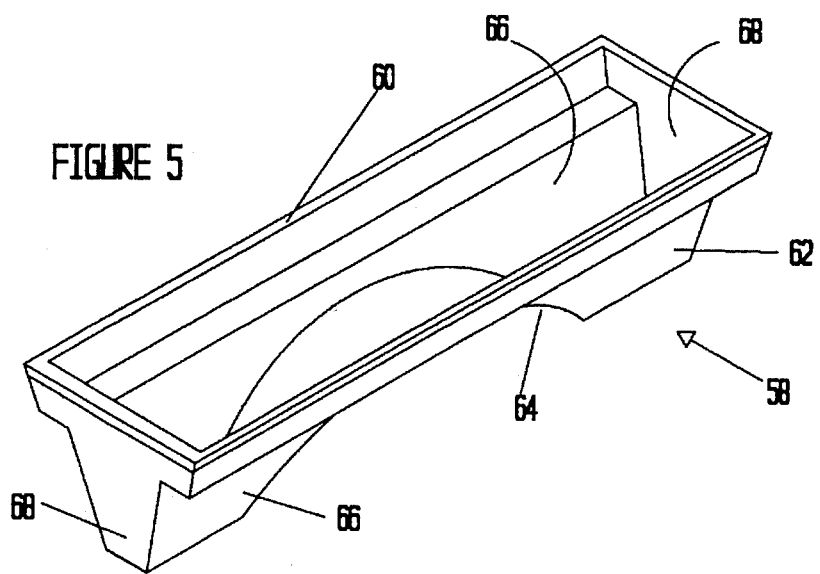
FIG. 5 is a perspective view of the underside of the pipe support of the invention.

Referring now to FIGS. 4 and 5, there is illustrated a subterranean pipe support. This pipe support 58 is typically a saddle having a base plate 60 with a central, longitudinal rib 62 that has an arcuate concavity 64 which forms a saddle. Preferable the sidewalls 66 and endwalls 68 of the pipe support 50 are tapered downwardly and outwardly, as illustrated, such that the cross section of the rib is a truncated, triangle. As apparent from FIG. 5, the pipe support 50 of the invention is hollow-form with a substantially uniform wall thickness throughout. This limited wall thickness and the tapered endwalls and sidewalls of the pipe support 50 readily permit placing pluralities of pipe supports in stacked arrays, are useful in shipping and storing of the pipe supports.

Figure 6:
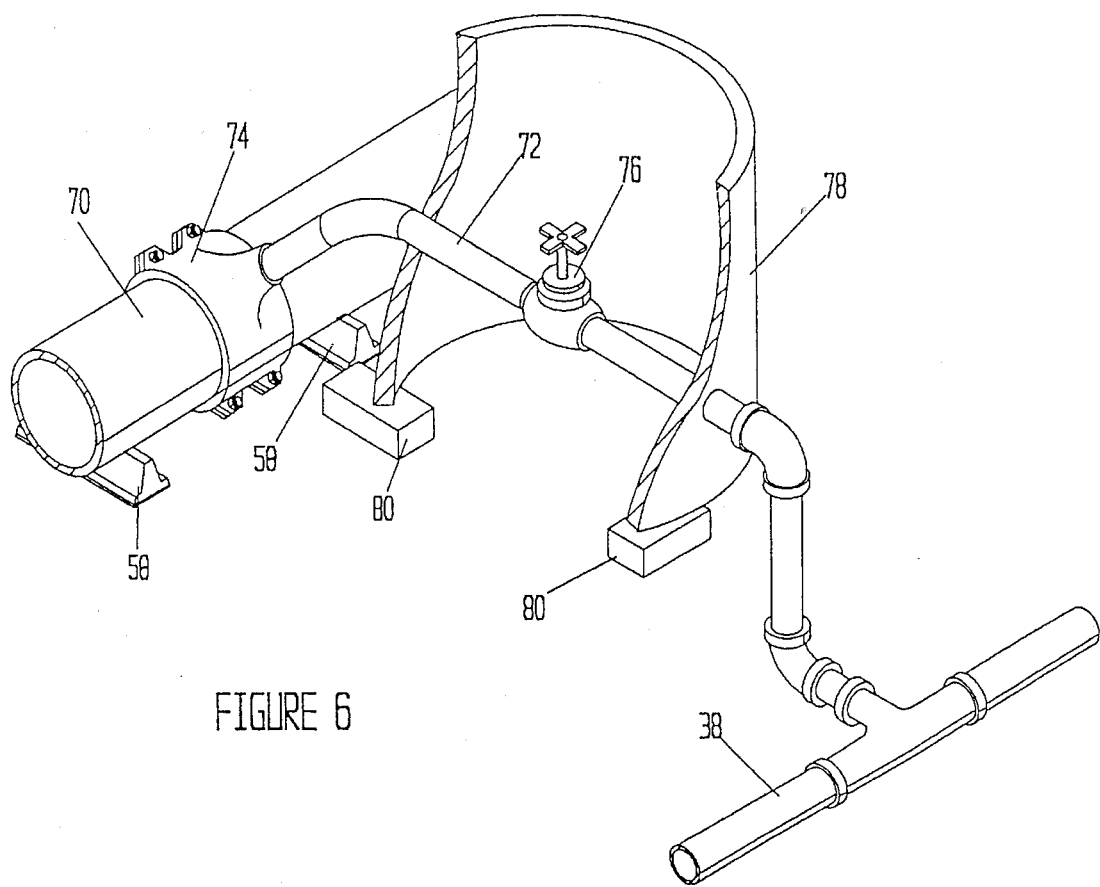
FIG. 6 is a perspective view of a typical installation utilizing the subterranean pipe supports of the invention.

Referring now to FIG. 6, there is illustrated a typical installation in which a subterranean water supply main 70 is shown supported by a plurality of the pipe supports 50 of the invention. Typically, the water main 70 has a plurality of branch lines 72 that extend from a bolted connector 74 to a valve 76 which is contained within a generally cylindrical well 78. Commonly the value wells are supported on one or more bricks 80 that are laid on a gravel, sand or aggregate sub-base. The branch lines 72 extend through hand values 76 to a subterranean irrigation pipe such as the pipe which serves as the supply line 38 illustrated in FIG. 3.

The pipe supports 50 of the invention greatly enhance the stability of water mains in underground irrigation systems. As previously mentioned, these mains are generally located approximately three or more feet beneath the ground surface in trenches which are partially filled with a supporting base of gravel, sand or loose aggregate. This provides a very stable base for the pipe supports which provide both vertical and lateral stability to the water mains, preventing settling and reducing the damage suffered from shifting soils or earthquakes.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an in-ground sprinkler installation comprising a pop-up sprinkler head housed within an in-ground cylindrical housing having at least one external protrusion the improvement comprising a support cage receiving said cylindrical housing which comprises:

a. a support member having an opening which receives said cylindrical housing and abuts said external protrusion;

b. a base member substantially parallel to, and spaced beneath said support member by a substantial distance, said base member having a substantially greater span than said support member;

c. a foraminous member extending downwardly and outwardly divergently between said support member and base member to provide bearing support to said support member, said foraminous forming said support cage.

2. In the in-ground sprinkler system of claim 1 wherein said support cage has a ratio of height to greatest span dimension from 0.5 to 3.

3. In the in-ground sprinkler system of claim 3 wherein said support member is an annular ring having an outer diameter no greater than the outside diameter of said annular lip.

4. In the in-ground sprinkler system of claim 3 wherein said support member is an annular ring having an outer diameter substantially no greater than the outside diameter of said annular lip.

5. In the in-ground sprinkler system of claim 1 wherein said base member is an annular ring having an inner diameter no less than the outer diameter of said support member.

6. In the in-ground sprinkler system of claim 1 wherein said base member is planar.

7. In the in-ground sprinkler system of claim 1 wherein said base member has a concave undersurface.

8. In the in-ground sprinkler system of claim 1 wherein said wall member comprises a plurality of spaced-apart support legs.

9. In the in-ground sprinkler system of claim 1 wherein said cylindrical housing has a second smaller housing attached to one side thereof, and said support member has a radial slot to receive said smaller housing.

10. In the in-ground sprinkler system of claim 1 wherein said support cage is molded of plastic.

11. In the in-ground sprinkler system of claim 1 wherein the inner diameter of said base member is substantially greater than the outer diameter of said support member, whereby said support cages can be placed in a stacked array.

12. In the in-ground sprinkler system of claim 1 including at least one subterranean water supply pipe with at least one branch line interconnecting to one said pop-up sprinkler head, the further improvement of a pipe support which comprises a hollow-form pipe saddle located beneath said pipe, and having a base plate and a longitudinal upstanding rib having a central concavity bearing against the undersurface of said pipe.

13. In the in-ground sprinklep system of claim 12 wherein said upstanding rib extends longitudinally coextensively with said base plate.

14. In the in-ground sprinkler system of claim 12 wherein said pip support is molded of plastics.

15. In the in-ground sprinkler system of claim 12 wherein the said rib has a truncated triangular cross-section with downwardly and outwardly beveled sidewalls wherein said pipe supports can be placed in a stacked array.

16. In an in-ground sprinkler system including at least one subterranean water supply main pipe with a plurality of laterally connected conduits leading to sprinkler stations, the improvement comprising:

at least one subterranean pipe support located beneath said main pipe and in supporting contact therewith, said support comprising a hollow-form pipe saddle having a base plate and a longitudinal upstanding rib having a central concavity received against the undersurface of said main pipe and formed of plastic with substantially uniform wall thickness, with the side walls of said base plate and said upstanding rib being bevelled downwardly and outwardly whereby a plurality of said pipe supports can be placed in a stacked array.

17. In the in-ground sprinkler system of claim 16 wherein said upstanding rib extends longitudinally coextensively with said base plate.

* * * * *